June 11, 1929.  R. DITISHEIM  1,716,952
SPEED REGULATING DEVICE
Filed Sept. 6, 1927  2 Sheets-Sheet 1

INVENTOR:
Robert Ditisheim
By [signature]
Atty.

June 11, 1929.  R. DITISHEIM  1,716,952
SPEED REGULATING DEVICE
Filed Sept. 6, 1927   2 Sheets-Sheet 2

INVENTOR:
Robert Ditisheim

Atty.

Patented June 11, 1929.

1,716,952

UNITED STATES PATENT OFFICE.

ROBERT DITISHEIM, OF LA-CHAUX-DE-FONDS, SWITZERLAND.

SPEED-REGULATING DEVICE.

Application filed September 6, 1927, Serial No. 217,763, and in Switzerland September 7, 1926.

The present invention relates to a speed regulating device in which the movement of a driving rotatable member is transmitted to a driven rotatable member by means of drivers adapted to be adjusted eccentrically to the axis of rotation.

According to the present invention the drivers are arranged in two ring rows to both sides of a guide ring eccentrically adjustable to the axis of rotation of the rotatable members, said drivers cooperating with radial guidances provided in said guide ring and the driver of each row projecting into an annular groove formed between a head fixed to the respective rotatable part and a rotatable ring adapted to be slightly eccentrically adjusted to that head by means of a thrust device, whereby during the rotation the drivers get one after the other to a clamping place formed by the eccentric position of the rotatable ring in order to transmit by the locking action in the manner of a friction locking mechanism the rotating movement of the driving rotatable member by the one row of drivers to the guide ring and from the latter by the other row of drivers to the driven rotatable member.

Figure 1:
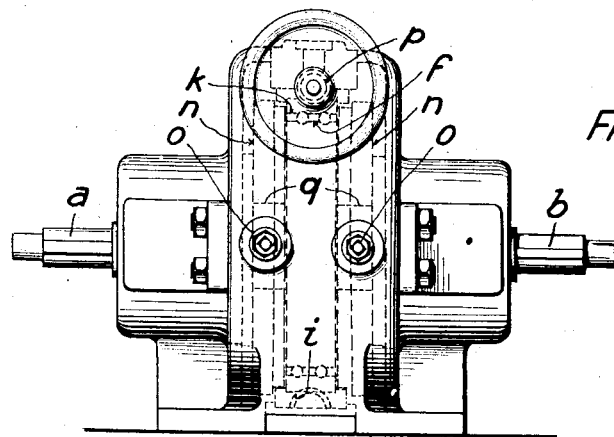
Figure 2:
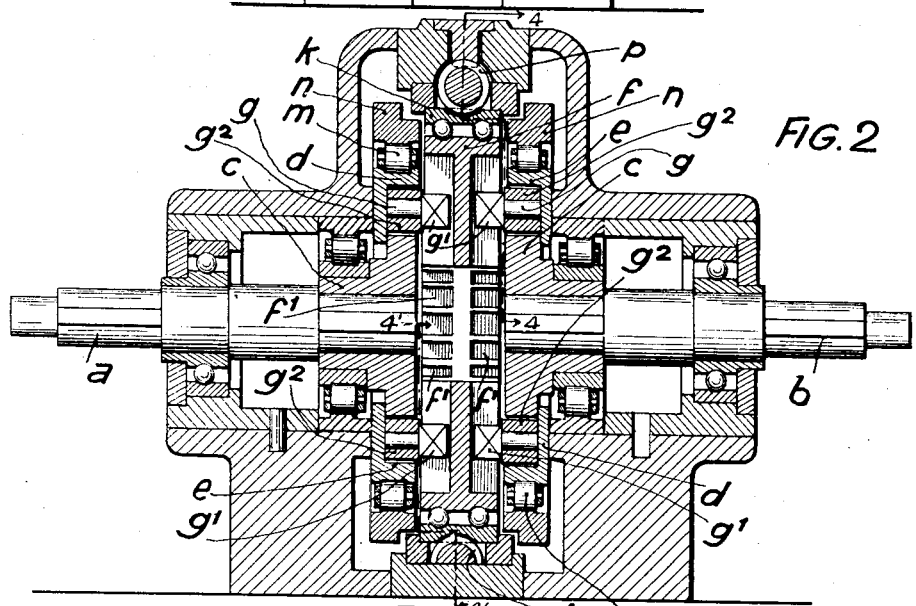
Figure 3:
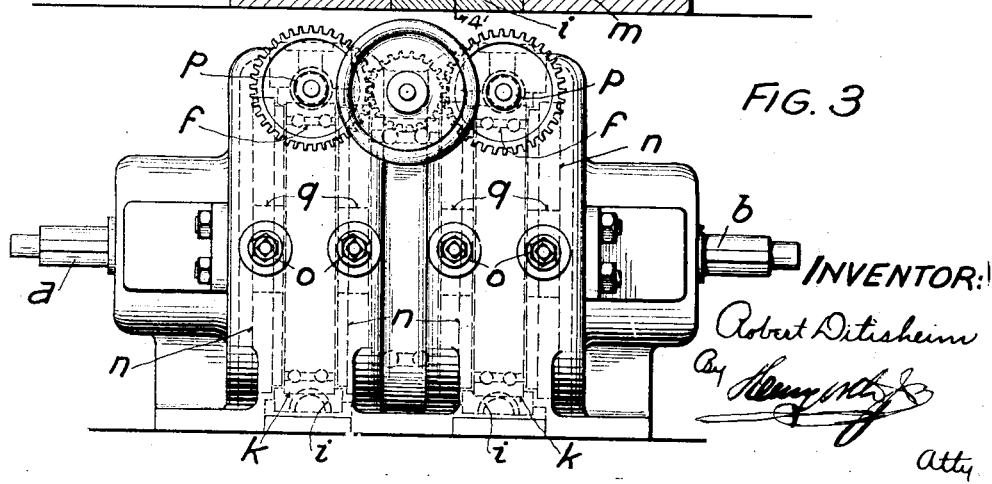
Figure 4:
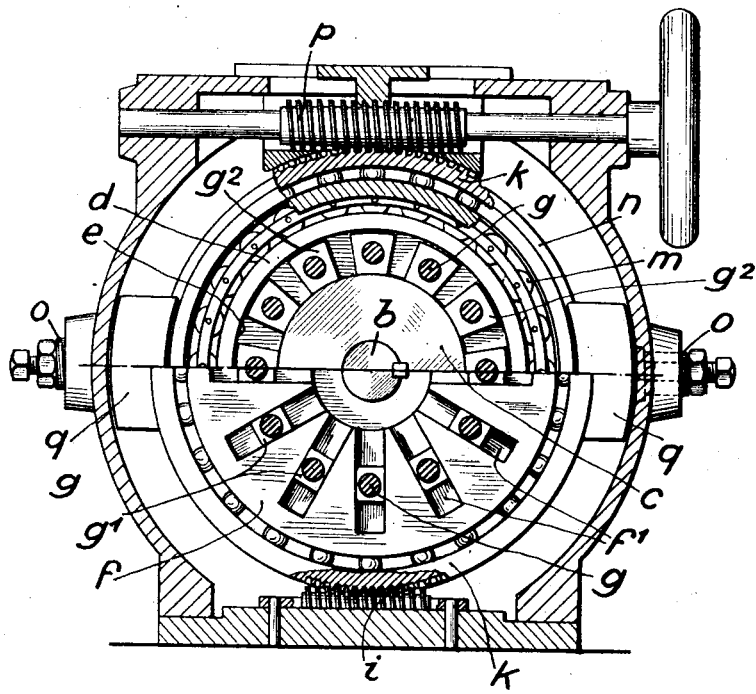

Two constructional examples of the subject matter of the present invention are illustrated on the accompanying drawings, in which Fig. 1 is an elevation view of a first constructional example, Fig. 2 is an axial section on a larger scale, Fig. 3 is an elevation view of a second constructional example, Fig. 4 is in its upper half a section along line 4—4 and in its lower half a section along line 4'—4' in Fig. 2.

Figure 5:
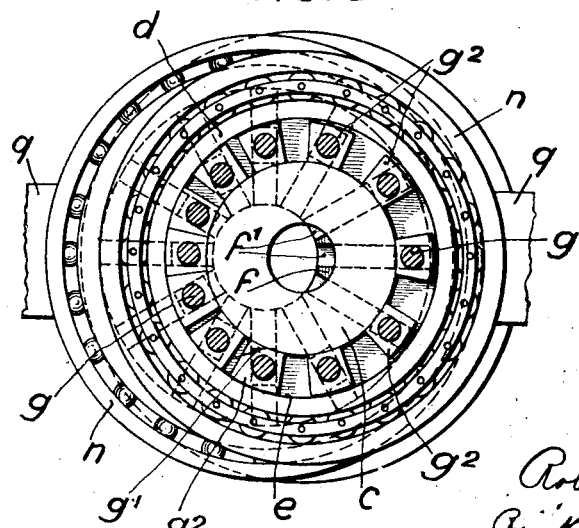

Fig. 5 is an end view of details with the guide ring eccentrically adjusted.

$a$ and $b$ designate two rotatable shafts arranged in alignment; in the following description the shaft $a$ may be assumed to be the driving shaft and the shaft $b$ the driven shaft. At their inner ends the shafts $a$ and $b$ are provided each with a cylindrical head $c$ rigidly fixed thereto, and each of the heads $c$ is surrounded by a rotatable ring $d$, forming with the respective head an annular groove $e$ and being slightly eccentrically adjustable to the common axis of the shafts, so that the width of the annular groove $e$ is narrowed in one place to form a clamping place and is correspondingly enlarged at the place diametrically opposite to the former.

Between the heads $c$ of the shafts $a$ and $b$ an eccentrically adjustable guide ring $f$ is arranged provided on both sides with radially disposed guide grooves $f^1$ for the drivers $g$. The latter are arranged in two ring rows one one each side of the guide ring $f$. Every driver consists of a pin (Fig. 4) having at one end a rectangular head $g^1$ adapted to cooperate with the respective radial guide groove $f^1$ and at the other end a locking segment $g^2$ for cooperation with the respective annular groove $e$.

The guide ring $f$ is rotatably mounted by means of ball bearings in a race ring $k$ provided with teeth at its outer circumference. The race ring $k$ meshes in its lower part with a stationary screw $i$, and in its upper part with a turnable screw threaded spindle $p$, by the rotation of which the race ring may be rolled on the screw $i$ transversely to the axis of the shafts in such a manner that the race ring and thereby the guide ring $f$ is displaced from its position concentric to the axis of the shaft into positions eccentric to the latter. The drivers $g$ remain thereby concentrically to the axis of the shafts, however, some of them are brought nearer to the geometrical axis of the guide ring $f$ and others are distanced from said axis as is illustrated in Fig. 5.

The eccentric adjustment of the rotatable rings $d$ relatively to the heads $c$ is effected by means of non-rotatable thrust rings $n$, mounted by roller bearings $m$ on the rings $d$, and screws $o$ and shoes $q$, which means permit of very accurately adjusting the eccentricity in order to determine the clamping pressure on the clamping place.

After this adjustment has been carried out and when the guide ring $f$ is coaxial to the axis of the shafts the drivers $g$ get, one after the other, with their locking segments $g^2$ to the clamping place of the annular grooves $e$ and are frictionally locked therein when the device rotates, whilst the wider parts of the annular grooves $e$ afford free passage to the locking segments.

In consequence thereof the driving shaft $a$ causes through the intermediary of the locked drivers $g$ of the one ring row of drivers the rotation of the guide ring $f$ and the latter, through the intermediary of the drivers $g$ of the other ring row rotates the driven shaft $b$, with the adjustment mentioned above the shaft $b$ will rotate with the same speed as the shaft $a$.

If the guide ring $f$ is adjusted eccentrically to the axis of the shafts by means of the race ring $k$ and by turning the spindle $p$ the operative radius of the rows of drivers on the clamping place of the annular grooves $e$ is altered, whereby the speed ratio of the two shafts is altered. The speed ratio depends on the eccentricity of the guide ring $f$ relatively to the axis of the shafts.

The regulation of the speed may be carried out during the running of the device and with the desired accuracy.

By suspending the pressure exerted on the thrust rings $n$ the gear runs idle. Obviously the gear is reversible. By arranging a plurality of such gear elements in series an aggregate is obtained in which the range of the relative velocities of both shafts may be enlarged as desired. Fig. 3 illustrates a gear which as regards the transmission elements is a duplication of the gear illustrated in Figs. 1, 2, 4 and 5.

The construction of the above described gear is very simple; it works without pawl and ratchet gears and therefore nearly noiselessly. The axes of both shafts $a$ and $b$ remain always in alignment. When the locking segments $q^2$ of the drivers $g$ are made of chromium-nickel-steel, gun metal, nitrated steel or the like wear of the latter is practically excluded.

I claim:

1. A speed regulating device, comprising in combination, a rotating driving member, a rotatable driven member, rotatable rings surrounding said members and forming annular grooves with the latter, race rings surrounding the rotatable rings, anti-friction members between said rotatable rings and said race rings, means for adjusting said race rings eccentrically to the axes of said members in order to shift the rotatable rings and provide for a clamping place in said annular grooves, a rotatable guide ring arranged between said rotatable members and rings and provided with radially disposed grooves on both sides, means adapted to adjust the eccentricity of said guide ring relatively to the axes of said rotatable members, and drivers arranged in two ring rows, one to each side of the guide ring, and provided with segments cooperating with said annular grooves and with portions cooperating with said radial grooves, one row of said drivers transmitting rotary motion between the driving member and said guide ring and the other row of drivers transmitting rotary motion between said guide ring and said driven member.

2. A speed regulating device, comprising in combination, a driving shaft, a driven shaft in alignment with said driving shaft, cylindrical heads on said shafts, rotatable rings surrounding said cylindrical heads, and forming annular grooves with the latter, means for adjusting said rings eccentrically to the axis of said shafts in order to provide for a clamping place in said annular grooves, a rotatable guide ring arranged between said rotatable rings and provided with radially disposed grooves on both sides, a race ring concentric to said guide ring, antifriction bodies inserted between said guide and race rings, teeth on the circumference of said race ring, a screw threaded spindle cooperating with said teeth for adjusting the eccentricity of said guide ring relatively to the axis of the shafts, and drivers arranged in two ring rows, one to each side of the guide ring, and provided with segments cooperating with said annular grooves and with members cooperating with said radial grooves, one row of said drivers transmitting rotary motion between said driving shaft and said guide ring and the other row of drivers transmitting rotary motion between said guide ring and the driven shaft, said transmission being effected by frictional locking action of said drivers in said annular grooves and the speed ratio being dependent on the eccentricity of said guide ring.

3. A speed regulating device, comprising in combination, a driving shaft, a driven shaft in alignment with said driving shaft, cylindrical heads on said shafts, rotatable rings surrounding said cylindrical heads, and forming annular grooves with the latter, thrust devices each comprising a ring surrounding said rotatable ring, antifriction bodies interposed between said two rings, a shoe adapted to cooperate with said ring and a screw for pressing said shoe against said ring for adjusting the eccentricity of said rotatable ring relatively to the axis of said shafts in order to provide a clamping place in said annular groove, a rotatable guide ring arranged between said rotatable rings and provided with radially disposed grooves on both sides, means adapted to adjust the eccentricity of said guide ring relatively to the axis of said shafts, and drivers arranged in two ring rows, one to each side of the guide ring, and provided with segments cooperating with said annular grooves and with members cooperating with said radial grooves, one row of said drivers transmitting rotary motion between said driving shaft and said guide ring and the other row of drivers transmitting rotary motion between said guide ring and the driven shaft, said transmission being effected by frictional locking action of said drivers in said annular grooves and the speed ratio being dependent on the eccentricity of said guide ring.

4. A speed regulating device, comprising in combination, a driving shaft, a driven shaft in alignment with said driving shaft, cylindrical heads on said shafts, rotatable rings surrounding said cylindrical heads, and forming annular grooves with the latter, thrust devices each comprising a ring surrounding said rotatable ring, antifriction bodies interposed between said two rings, a shoe adapted to cooperate with said ring and a screw for pressing said shoe against said ring for adjusting the eccentricity of said rotatable ring relatively to the axis of said shafts in order to provide a clamping place in said annular groove, a rotatable guide ring arranged between said rotatable rings and provided with radially disposed grooves on both sides, a race ring concentric to said guide ring, antifriction bodies inserted between said guide and race rings, teeth on the circumference of said race ring, a screw threaded spindle cooperating with said teeth for adjusting the eccentricity of said guide ring relatively to the axis of the shafts, and drivers arranged in two ring rows, one to each side of the guide ring, and provided with segments cooperating with said annular grooves and with members cooperating with said radial grooves, one row of said drivers transmitting rotary motion between said driving shaft and said guide ring and the other row of drivers transmitting rotary motion between said guide ring and the driven shaft, said transmission being effected by frictional locking action of said drivers in said annular grooves and the speed ratio being dependent on the eccentricity of said guide ring.

In testimony whereof, I have signed my name to this specification.

ROBERT DITISHEIM.